(12) United States Patent
Jablin

(10) Patent No.: US 6,675,528 B2
(45) Date of Patent: Jan. 13, 2004

(54) MOSQUITO INCINERATOR

(76) Inventor: Richard Jablin, 2500 W. Club Blvd., Durham, NC (US) 27705

(*) Notice: Subject to any disclaimer, the term of this patent is extended or adjusted under 35 U.S.C. 154(b) by 0 days.

(21) Appl. No.: 10/229,429

(22) Filed: Aug. 28, 2002

(65) Prior Publication Data
US 2003/0051391 A1 Mar. 20, 2003

Related U.S. Application Data
(60) Provisional application No. 60/318,937, filed on Sep. 14, 2001.

(51) Int. Cl.⁷ .................. A01M 1/02; A01M 1/06; A01M 1/20
(52) U.S. Cl. ............... 43/139; 43/107; 43/129; 43/132.1
(58) Field of Search ............... 43/132.1, 139, 43/113, 107, 125, 129, 144; 239/34

(56) References Cited

U.S. PATENT DOCUMENTS 2,182,863 A * 12/1939 Dodder ............... 43/113
2,694,879 A * 11/1954 Stoll ................... 43/139

(List continued on next page.)

FOREIGN PATENT DOCUMENTS

| AU | 9511632 B1 | * | 8/1995 | |
|----|------------|---|--------|---|
| AU | 9944477 B1 | * | 3/2000 | |
| CA | 631512 B1 | * | 11/1961 | ............ 43/139 |
| JP | 10-229801 B1 | * | 9/1998 | |
| JP | 11-28040 B1 | * | 2/1999 | |
| JP | 11-103748 B1 | * | 4/1999 | |
| JP | 2001-309744 B1 | * | 11/2001 | |
| JP | 2002-369647 B1 | * | 12/2002 | |
| JP | 2003-9746 B1 | * | 1/2003 | |
| WO | WO-99/26471 B1 | * | 6/1999 | |
| WO | WO-99/35908 B1 | * | 7/1999 | |
| WO | WO-00/03588 B1 | * | 1/2000 | |

Primary Examiner—Darren W. Ark
(74) Attorney, Agent, or Firm—Jeffrey K. Seto

(57) ABSTRACT

An apparatus for destroying mosquitoes by luring them into the apparatus where they are killed and their remains are incinerated. In order to lure the mosquitoes to the apparatus a mixture is emitted that attracts mosquitoes. The mixture contains a chemical attractant for mosquitoes that is stored in a container and metered out automatically. The mixture also contains carbon dioxide that is produced by the incineration of the mosquitoes and the chemical attractant. The apparatus includes an electric heater that heats the apparatus so that its skin temperature approximates the temperature of human skin. Once the mosquitoes are within the apparatus, a high velocity stream of recirculated air captures and carries them to a fan where they are killed and shredded. The shredded remains are incinerated to produce the carbon dioxide and to avoid the disposal of captured mosquitoes. Only a small portion of the recirculated air is emitted to the atmosphere thereby minimizing the consumption of electrical energy.

16 Claims, 2 Drawing Sheets

U.S. PATENT DOCUMENTS

| | | | | |
|---|---|---|---|---|
| 2,851,818 A | * | 9/1958 | Matheny | 43/129 |
| 3,319,374 A | * | 5/1967 | Gawne | 43/139 |
| 3,793,763 A | * | 2/1974 | Griffin et al. | 43/129 |
| 3,987,578 A | * | 10/1976 | Rueff | 43/139 |
| 4,228,124 A | * | 10/1980 | Kashihara et al. | 43/129 |
| 4,506,473 A | * | 3/1985 | Waters, Jr. | 43/107 |
| 4,519,160 A | * | 5/1985 | McBrayer | 43/113 |
| 4,856,226 A | * | 8/1989 | Taylor | 43/113 |
| 4,907,366 A | * | 3/1990 | Balfour | 43/132.1 |
| 5,099,598 A | * | 3/1992 | Carter | 43/132.1 |
| 5,123,201 A | * | 6/1992 | Reiter | 43/107 |
| 5,167,090 A | * | 12/1992 | Cody | 43/139 |
| 5,241,779 A | * | 9/1993 | Lee | 43/139 |
| 5,255,468 A | * | 10/1993 | Cheshire, Jr. | 43/113 |
| 5,282,334 A | * | 2/1994 | Kimura et al. | 43/129 |
| 5,301,458 A | * | 4/1994 | Deyoreo et al. | 43/139 |
| 5,311,697 A | * | 5/1994 | Cavanaugh et al. | 43/132.1 |
| 5,595,018 A | * | 1/1997 | Wilbanks | 43/139 |
| 5,647,164 A | * | 7/1997 | Yates | 43/139 |
| 5,657,576 A | * | 8/1997 | Nicosia | 43/132.1 |
| 5,669,176 A | * | 9/1997 | Miller | 43/139 |
| 6,050,025 A | * | 4/2000 | Wilbanks | 43/139 |
| 6,145,243 A | * | 11/2000 | Wigton et al. | 43/139 |
| 6,467,215 B1 | * | 10/2002 | Nelson et al. | 43/139 |
| 6,484,438 B2 | * | 11/2002 | Matsunaga et al. | 43/129 |
| 6,516,559 B1 | * | 2/2003 | Simchoni et al. | 43/107 |
| 6,568,124 B1 | * | 5/2003 | Wilbanks | 43/139 |
| 6,574,914 B2 | * | 6/2003 | Smith | 43/139 |

* cited by examiner

MOSQUITO INCINERATOR

This application was originally filed as U.S. Provisional Patent Application No. 60/318,937, filed on Sep. 14, 2001.

BACKGROUND OF INVENTION

1. Field of Invention

This invention relates to Mosquito Incinerator equipment that attracts, captures, destroys and incinerates mosquitoes.

2. Description of Prior Art

Mosquitoes are a plague to the world. They bite people, creating welts and allergies. They force people to go indoors when those involved would prefer to stay outdoors. Also, mosquitoes are a serious vector for the transmission of diseases, some of which may be fatal. Worldwide, mosquito-borne diseases kill more people than any other single factor.

There are many devices that have been invented for the purpose of eradicating mosquitoes. Some of these devices have been brought to market. Most such devices do not eradicate or kill mosquitoes, except by chance. One such ubiquitous device is a "zapper" in which a light is supposed to attract the mosquitoes that are then killed by electrocution. In actuality, the zapper appears to mainly kill insects other than mosquitoes.

Another device which claims to kill mosquitoes is the "Mosquito Killer", covered by U.S. Pat. No. 5,595,018. It employs a heating element to raise the temperature of the device, relying solely on the mosquito's ability to sense heat to find its prey. Heat does attract mosquitoes, but heat is only one of the attractants for mosquitoes. There are other attractants for mosquitoes that, in combination with heat provide substantially increased attraction. The device also suffers from three drawbacks. First, it consumes large amounts of electrical energy because the air that is heated is immediately forced out of the device and all of its thermal energy is lost to the atmosphere. Second, it is not practical to add chemical attractant to the exiting air because of the airflow design. Third, the price of the device, (about $500), is high enough to be beyond the financial means or objectives of many people.

Still another device utilizes the heat of an electric light to attract mosquitoes and once these insects are near the device, a fan that is internal to the device, sucks the insects in and destroys them. This device is priced lower, ($50 to $100), depending on the model, but this device also has the drawback that it uses only heat to attract the insects.

Still another device is the Mosquito Magnet that uses heat, carbon dioxide and a chemical attractant in combination to attract mosquitoes to the device. The device captures the insects in a bag from which they must be disposed periodically. This device has proven to be effective, but suffers from three other drawbacks. First, it is large and heavy. Second, it consumes a substantial quantity of propane and it is reported to require a new tank of propane every three weeks when run continuously. Third, it is costly, (in the neighborhood of $1,000 per unit).

Much is known about what attracts mosquitoes. For one, there are a wide variety of mosquitoes and each variety has its own particular characteristics and each variety responds to attractants in its own way. There are more than 270 different chemical attractants for mosquitoes. Nevertheless, entomologists agree on certain attractants. Body heat is certainly one attractant. Carbon dioxide is another and the entomologist often uses dry ice, (frozen carbon dioxide), when seeking to trap mosquitoes. Chemical attractants, such as lactic acid and octenol also attract mosquitoes, however the attraction is greatly enhanced by the presence of carbon dioxide.

A study of the take-off rate of mosquitoes in clean air showed that the addition of 0.2% carbon dioxide resulted in an increased rate of take-off Another study showed that a blend of 0.11% carbon dioxide and 85 ug/ml of lactic acid induced a peak rate. The study concluded that carbon dioxide and lactic acid together resulted in the highest rate of take-off.

The present invention employs the simultaneous presence of heat, carbon dioxide and a chemical attractant to lure the mosquitoes into the device. The device then captures, kills and incinerates the insects.

One significant novel feature of the present invention is that it recirculates most of the air that it heats, thereby saving electrical energy. Another novel feature is that it produces carbon dioxide by incinerating the mosquitoes and by burning a portion of the chemical attractant. Still another novel feature is a built-in reservoir for the chemical attractant together with the means for distributing the attractant in combination with water vapor and carbon dioxide to the atmosphere that surrounds the device.

Finally, what is important for the widespread use of the present invention is that it is compact, light in weight and can be produced at an affordable price.

SUMMARY OF THE INVENTION

This invention provides a system and device for destroying mosquitoes. The device has a housing, preferably of plastic, that encloses a small fan for moving air, a tank for containing a chemical attractant for mosquitoes and an electric heater that heats the air and, at the same time incinerates the mosquitoes. The fan shreds mosquitoes that are attracted to the device and that enter it. Most of the air that the fan moves is recirculated in order to carry the mosquitoes to their destruction. A small portion of the recirculated air is passed over a high temperature electric heater that maintains the device at a desired, controlled and elevated temperature and that incinerates the insects. Another small portion of the recirculated air is delivered to the atmosphere, carrying with it carbon dioxide and the chemical attractant.

One object of the invention is to provide the maximum attraction for mosquitoes by emitting, in a substantially simultaneous manner, a mixture of carbon dioxide, water vapor and a chemical attractant so as to closely mimic the substances of the human body that attract mosquitoes.

Another object of the invention is to maintain its internal temperature high enough so that the skin temperature of the device mimics closely the skin temperature of the human body. The device provides a means for controlling and regulating this temperature to achieve a skin temperature that is most attractive to the mosquitoes in the region in which the device is being used.

Still another object of this invention is to incinerate the mosquitoes such that their disposal is not required. The process of incineration has the additional benefit in that it produces carbon dioxide to help in attracting mosquitoes. The more mosquitoes there are in a region, the more will enter the device and the more carbon dioxide will be produced. The device responds to an increased presence of mosquitoes by increasing its emissions of attractants.

Still another object of this invention is to conserve electrical energy by recirculating most of the air that is moved by the fan.

Still another object of this invention is to provide an integral container to store a chemical attractant for mosquitoes from which container the attractant is automatically dispensed so that the unit may operate unattended for an extended period of time.

Still another object of this invention is to provide a device that is compact, light in weight and low in cost, the latter being deemed essential for the widespread use of the apparatus.

Other objects and a fuller understanding of the invention will become apparent by referring to the following description and claims, taken in conjunction with the accompanying drawings.

DETAILED DESCRIPTION OF THE PREFERRED EMBODIMENTS OF THE INVENTION

Figure 1:
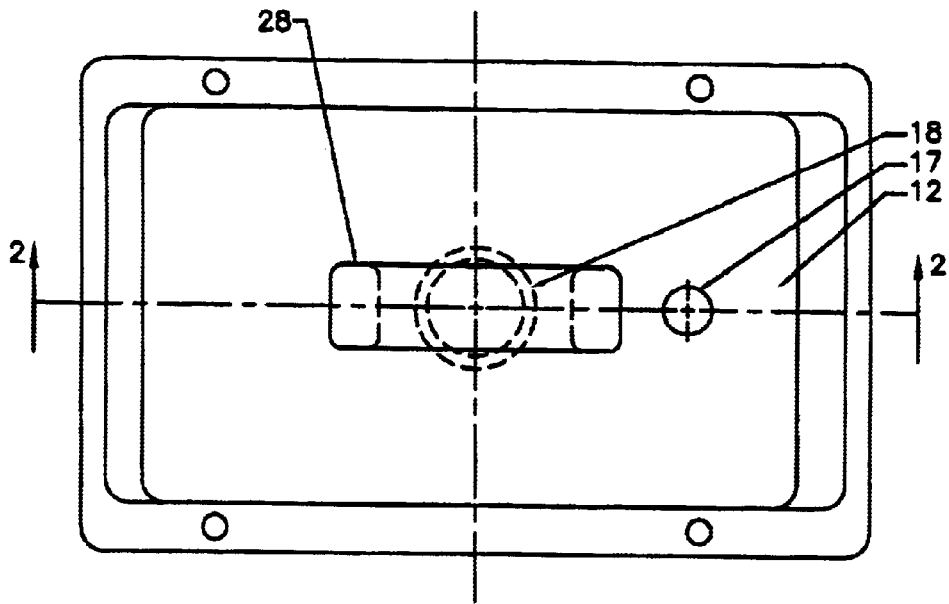
FIG. 1 is a top view of the Mosquito Incinerator.
Figure 2:
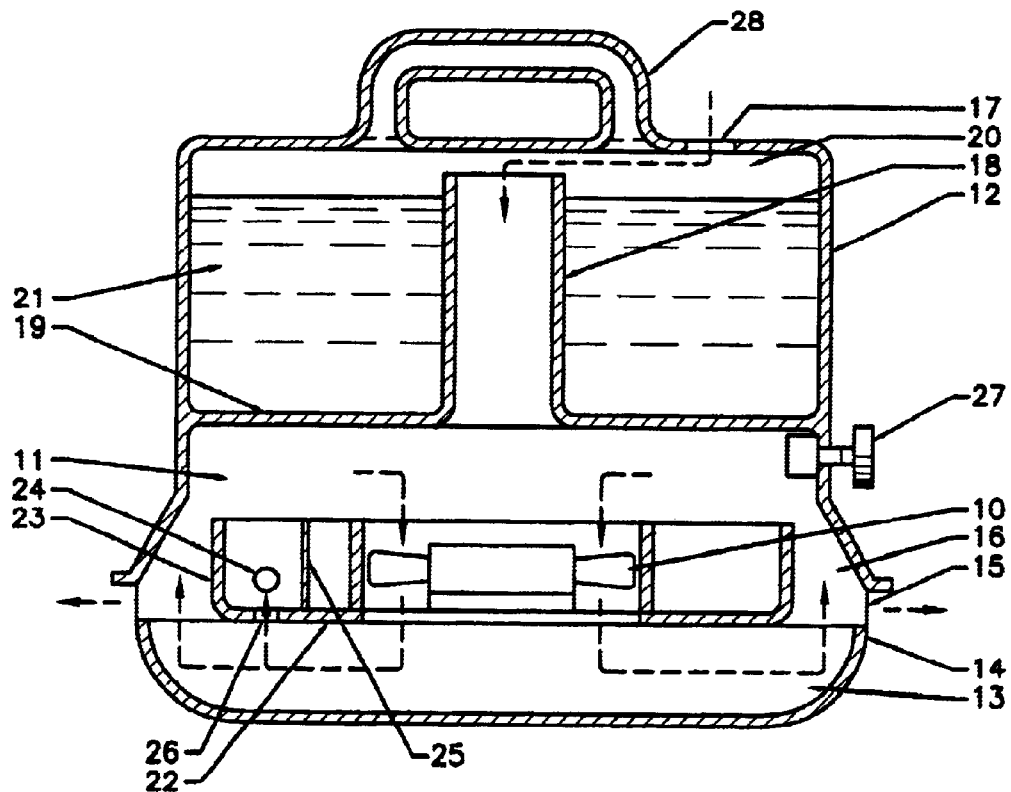
FIG. 2 is a cross section taken on line 2—2 of FIG. 1.

Referring now to the drawings in which like reference numerals denote corresponding parts throughout the various diagrams, the numeral 10 indicates the fan that recirculates the air from the space above said fan to the space below said fan. In the diagram of FIG. 2, the various flows of air are indicated by the dotted lines, the direction of flow being indicated by the arrows. The space 11 above said fan is bounded essentially by the upper housing 12 and said fan. The space 13 below said fan is bounded essentially by the lower housing 14 and said fan There are large gaps 15, essentially across the full width of said upper housing that serves two purposes. The first purpose is to permit the emission of gas and vapor from the inside to the outside of said housing. The second purpose is to equalize the air pressure between the space 13 and the external atmosphere. The air pressure under said fan is approximately the same as atmospheric pressure.

In the recirculation of the air from the space 13 to the space 11, the air passes through the venturi channels 16. Because the space 13 is at atmospheric pressure, the pressure drop through said venturi channels causes the space 11 to be at negative atmospheric pressure. This negative air pressure causes air to be sucked from the atmosphere into space 11 through orifice hole 17 and tube 18. Since the cross sectional area of said tube 18 is much larger than that of said orifice hole 17, the area of said orifice hole 17 controls the rate of air flow into space 11. It is readily seen that the rate of flow of air out of space 13 to the atmosphere is equal to the rate of flow into space 11.

Partition 19 divides housing 12 into two spaces. Above said partition 19 is a container 20 for storing chemical attractant 21. Preferably the chemical attractant is in a mixture with water. Below said partition 19 is space 11. Air passing from the atmosphere through orifice hole 17 impinges the surface of said chemical attractant 21 and assists in releasing vapors of water and chemical attractant, said vapors being then carried into space 11.

Figure 3:
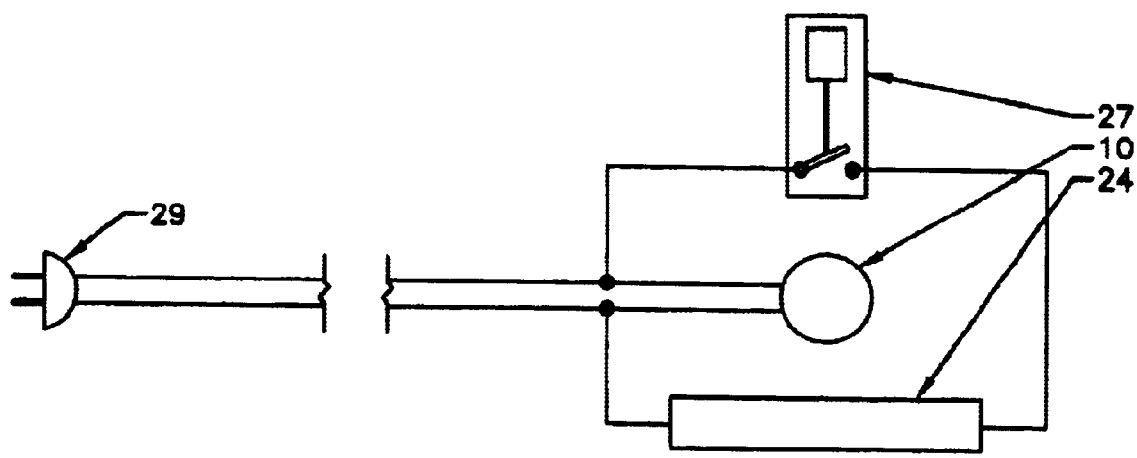
FIG. 3 is a diagram of the electrical system for the Mosquito Incinerator.

The fan 10 is mounted on and secured to the fan base 22, which has two flanges 23. The spaces between said flanges and the upper housing 12 defines the shape of the venturi channels 16. An electric heater element 24 is housed in the space between one of said flanges and the divider 25. A small amount of the recirculated air bypasses the main flow of recirculated air, passing through opening 26 in said fan base and impinging on said electric heater element. Said electric heater element is controlled by adjustable thermostatic switch 27, which responds to the temperature of the recirculated air. When said electric heater element is energized, its temperature is above 1200 degrees Fahrenheit, which is adequate for incineration of any organic particles that are in the recirculated air. Electric power is delivered to fan 10 and to electric heater element 24 by electric plug and electric wires 29, shown in FIG. 3.

In the operation of the Mosquito Incinerator, the fan 10 recirculates air from space 13 to space 11, a small amount of the recirculated air passing over electric heater element 24, thereby heating the recirculated air to a temperature that is controlled by the setting of thermostatic switch 27. A small amount of air passes through the orifice hole 17 of the Mosquito Incinerator and enters the container 20 where it mixes with vapors of water and chemical attractant 20, the mixture then passing to space 11 and becoming a part of the recirculated air. There are many different chemical attractants corresponding to various types of mosquitoes, lactic acid and octenol being two of such attractants. Both chemicals are organic and contain carbon that, at incineration, produces carbon dioxide. An amount of recirculated air equal to the amount of entering air passes out to the atmosphere through the gaps 15. Said electric heater element turns on when the temperature of the recirculated air is below the setting of the thermostatic switch. When it is on, incineration takes place, both of the particles of mosquitoes that have been shredded by the fan and of the chemical attractant, thereby producing carbon dioxide. When it is off, incineration ceases. The emissions from the Mosquito Incinerator, equal in volume to the amount of entering air, then contain a mixture of air, carbon dioxide, chemical attractant and a portion of mosquito particles.

Mosquitoes are attracted to the Mosquito Incinerator by the nature of the emissions therefrom and by the fact that the skin temperature of the unit has been raised by conduction of heat from the interior of the apparatus to a temperature approximately that of the human body. Mosquitoes enter the unit through gaps 15, flying against the low velocity air current as they normally do fly to reach their prey. Once inside the unit, they are captured by the high flow of recirculated air and are carried into the fan 10, where they are killed and shredded.

The preferred construction materials are plastic for the upper and lower housing and stainless steel for the fan base and its partition. It is obvious that other construction materials may be used as dictated by considerations of cost and end use. It is also obvious that many different chemical attractants may be used in the operation, said attractants including not only liquids, but solids and vapors as well. In the class of solids are included powders and greases. Vapors may be metered from a tank that is under pressure. Additionally, the amount of carbon dioxide may be augmented by its introduction from a separate fermentation process.

The flow of recirculated air as described is from space 13 to space 11. This has the advantage that the venturi channels 16 are placed with the entering end down, thereby creating a rain hood over gaps 15. It is obvious the direction of flow may be reversed, in which case the large ends of said venturis will be above the small ends and the container 20 as well as orifice hole 17 will be located in lower housing 14, below space 13. In this instance, it may be seen that tube 18 can be eliminated.

The assembled Mosquito Incinerator is compact, light in weight and friendly to the environment. It requires a small amount of electric energy, the amount being required to heat the small volume of incoming air plus the heat losses from the skin of the unit. There is no disposal needed for the mosquitoes. Most are incinerated and the small portion that is emitted is in the form of particles that are too fine to be readily seen. The only noise is the hum of the fan that is inaudible from a short distance away. A handle 28 is provided on top of the Mosquito Incinerator, attached to the exterior of upper housing 12. The handle 28 can be used to carry and hang the unit in desirable locations.

The orifice hole 17 is shown uncovered. An option is to mount a cover, somewhat larger than the size of said orifice hole a short, adjustable distance above said orifice hole. The purpose of said cover is to keep out rain and dust as well as to adjust the volume of incoming air.

Although this invention is directed toward an apparatus for the destruction of mosquitoes, using the appropriate chemical attractant, it may serve for the destruction of other harmful insects. It may also be built in large sizes for covering a wide area.

Since many variations could be made to the Mosquito Incinerator disclosed and many different embodiments of the invention could be made without departing from the scope thereof, it is intended that all matter contained in the above description and accompanying drawings shall be interpreted as being illustrative and not limiting.

What is claimed is:

1. An apparatus for attracting and destroying insects, including mosquitoes, wherein once inside the apparatus insects are shredded by a fan and insect parts are incinerated by a heating element, thereby creating carbon dioxide and negating a need to remove dead insects from the apparatus, wherein the apparatus comprises:

an outer casing that forms an exterior of the apparatus;

a storage unit for holding an attractant, wherein the attractant is a chemical or chemical mixture to which one or more insects are attracted;

an air vent, wherein the air vent is an opening in the outer casing that allows air into the apparatus;

an electric fan that moves air within the apparatus from an inlet side to an outlet side of the fan thereby creating a lower atmospheric pressure on the inlet side, wherein the fan is held within the apparatus by a support base that is substantially a same width as the apparatus;

the heating element which is mounted on the support base, wherein air can travel between the inlet and outlet sides of the fan, past the heating element, and further wherein the heating element is capable of reaching a temperature of at least 1,200° F.; and, one or more exterior outlets, wherein the one or more outlets comprise one or more other openings in the outer casing, the one or more exterior outlets being substantially larger than the air vent;

wherein, air from the air vent and heat from the heating element aid in turning the attractant into a heated vapor, part of the heated vapor escaping from the apparatus through the exterior outlets and a balance of the heated vapor being recirculated within the apparatus, wherein insects attracted by the escaping heated vapor enter the apparatus via the exterior outlets, are pulled by suction to the inlet side of the fan, shredded by the fan, and subsequently incinerated by the heating element.

2. The apparatus of claim 1, wherein the attractant is lactic acid or octenol.

3. The apparatus of claim 1, wherein a thermostatic switch is used to control the temperature of the heating element.

4. The apparatus of claim 1, wherein the outer casing of said apparatus is heated by the recirculated vapor and air, via the heating element, to a temperature that is approximately equal to that of the skin of a human person.

5. The apparatus of claim 1, wherein the heated vapor is a mixture that includes heated air, water vapor, evaporated chemical attractant and carbon dioxide, and further wherein the carbon dioxide is produced by the incineration of insects and of the evaporated chemical attractant.

6. The apparatus of claim 5, wherein the production of carbon dioxide is augmented by another carbon dioxide producing process including, fermentation.

7. The apparatus of claim 1, wherein the attractant is in a liquid form or a solid form.

8. The apparatus of claim 1, wherein a carrying handle or a hanging handle is provided on top of the outer casing, and wherein overhangs are provided for the one or more exterior outlets to prevent rain and dust from entering the apparatus.

9. A method for destroying insects, including mosquitoes, wherein the insects are lured to an apparatus, pulled inside the apparatus, shredded by a fan and incinerated by a heating element, the incineration producing carbon dioxide and negating a need to remove dead insects from the apparatus, the method comprising the steps of:

storing an attractant within the apparatus, wherein the attractant is a chemical or chemical mixture to which one or more insects are attracted;

placing an air vent in an outer casing of the apparatus, wherein the air vent is located above a storage unit, the air vent comprising an opening in the outer casing that allows air into the apparatus;

using an electric fan to move air within the apparatus from an inlet side to an outlet side of the fan, thereby creating a lower atmospheric pressure on the inlet side, wherein the fan is held within the apparatus by a support base that is substantially a same width as the apparatus;

heating the apparatus with the heating element which is mounted on the support base, wherein the air can travel between the inlet and outlet sides of the fan, past the heating element, and further wherein the heating element is capable of reaching a temperature of at least 1,200° F.;

providing one or more exterior outlets, wherein the one or more outlets comprise one or more other openings in the outer casing, the one or more exterior outlets being substantially larger than the air vent;

creating a heated vapor from the air, the attractant, heat from the heating element, and carbon dioxide from incineration of insects and a portion of the attractant;

allowing a portion of the heated vapor to escape from the apparatus through the exterior outlets; and, recirculating a balance of the heated vapor within the apparatus, wherein insects attracted by the escaping heated vapor enter the apparatus via the exterior outlets, are pulled by suction to the inlet side of the fan, shredded by the fan, and subsequently incinerated by the heating element.

10. The method of claim 9, wherein the attractant is lactic acid or octenol.

11. The method of claim 9, wherein a thermostatic switch is used to control the temperature of the heating element.

12. The method of claim 9, wherein the outer casing of said apparatus is heated to a temperature that is approximately equal to that of the skin of a human person.

13. The method of claim 9, wherein the heated vapor is a mixture that includes heated air, water vapor, the chemical attractant and carbon dioxide, and further wherein the carbon dioxide is produced by the incineration of insects and of the chemical attractant.

14. The method of claim 13, wherein the production of carbon dioxide is augmented by another carbon dioxide producing process including, fermentation.

15. The method of claim 9, wherein the attractant is in a liquid form or a solid form.

16. The method of claim 9, wherein a carrying handle or hanging handle is provided on top of the outer casing, and wherein overhangs are provided for the air vent and the one or more exterior outlets to prevent rain and dust from entering the apparatus.

* * * * *